US012317856B2

(12) United States Patent
Powell

(10) Patent No.: US 12,317,856 B2
(45) Date of Patent: Jun. 3, 2025

(54) REMOVABLY ATTACHABLE MANGER COVER AND SYSTEM FOR HORSE TRAILERS

(71) Applicant: Ryan Powell, Marsing, ID (US)

(72) Inventor: Ryan Powell, Marsing, ID (US)

( * ) Notice: Subject to any disclaimer, the term of this patent is extended or adjusted under 35 U.S.C. 154(b) by 406 days.

(21) Appl. No.: 17/987,118

(22) Filed: Nov. 15, 2022

(65) Prior Publication Data

US 2024/0156045 A1 May 16, 2024

(51) Int. Cl.
*A01K 1/00* (2006.01)
*A01K 5/01* (2006.01)

(52) U.S. Cl.
CPC .............. *A01K 1/0035* (2013.01); *A01K 5/01* (2013.01)

(58) Field of Classification Search
CPC ...... A01K 1/0035; A01K 5/01; A01K 5/0225; A01K 1/10
See application file for complete search history.

(56) References Cited

U.S. PATENT DOCUMENTS

| | | | |
|---|---|---|---|
| 3,695,698 A * | 10/1972 | Trump | B60R 21/06 297/487 |
| 4,763,944 A * | 8/1988 | Fry | B60P 7/14 296/180.1 |
| 5,189,985 A | 3/1993 | Brady et al. | |
| 5,909,717 A | 6/1999 | Randall | |
| D449,905 S | 10/2001 | Laurence | |
| 6,302,463 B1 * | 10/2001 | Moore | B60R 21/06 296/37.16 |
| 6,428,044 B1 * | 8/2002 | Ghantae | B60R 21/06 280/805 |
| 6,497,195 B1 | 12/2002 | Beyers | |
| 6,612,606 B1 * | 9/2003 | Bergenheim | B60R 21/16 5/118 |
| 7,753,000 B1 | 7/2010 | Turner | |
| D658,337 S | 4/2012 | Crossing | |
| 8,568,071 B2 * | 10/2013 | Dier | B60P 7/135 410/118 |
| 8,677,940 B1 | 3/2014 | Anderson et al. | |
| D742,078 S | 10/2015 | Singh | |
| 2006/0201445 A1 * | 9/2006 | Stonier | A01K 5/01 119/707 |

* cited by examiner

*Primary Examiner* — Ebony E Evans

(57) ABSTRACT

A removably attachable cover system includes a cover, first trailer fasteners, and second trailer fasteners. The cover may be removably attachable to an inner wall and manger of the trailer so as to cover feed for a horse. The cover may include a first side member, a second side member, a third side member, and a fourth side member. The cover may also have a first strap, a second strap, a third strap, and a fourth strap. The first strap and second strap may be interposed between the second side member and fourth side member. The third strap and fourth strap may be interposed between the first side member and the third side member. With the first, second, third, and fourth straps attached to the cover, a generally grid-shaped cover may be produced and second apertures may be found therethrough, where the horse may feed.

1 Claim, 9 Drawing Sheets

REMOVABLY ATTACHABLE MANGER COVER AND SYSTEM FOR HORSE TRAILERS

CROSS-REFERENCE TO RELATED APPLICATIONS

Not applicable.

TECHNICAL FIELD

The present disclosure relates to an animal feed cover. More particularly, the present disclosure relates to a cover that is used with mangers to monitor feeding and prevent removal of feed.

BACKGROUND

Living quarters horse trailers have become important to many ranchers and for those involved in rodeo. Often, these trailers, and other horse trailers, will include mangers where horses, for example, will feed during a journey. Users of these types of trailers have relied on hay bags for years. Hay bags allow a user to place a leaf of hay inside the bag and hang it in the trailer. Due to their design and the manner in which these types of bags couple to the inside of a trailer, a user may use up numerous hay bags in a year. In particular, what happens is that these bags are typically placed in awkward positions on the inner walls of the trailer for a horse to feed. Accordingly, the horse may become frustrated and try to move the hay bag, which bag may ultimately find its way to the floor where hay or other feed is wasted, the horse becomes over stimulated (overtime may cause health problems), and the bag becomes ruined from the horses standing and pawing at it, thereby increasing costs for a user to replace feed and bags.

Further, traditional hay bags may be placed within a manger and easily moved by an animal, resulting in similar outcomes as discussed above. At times, a user may attempt to fasten these hay bags to the manger; however, this limits the functions and use of the manger to act as a feed trough. This approach also is cost prohibitive because an enclosed bag, with all the extra components and material, is unnecessary to contain a leaf of hay when utilizing a manger. Not only do the hay bags found on the market have many shortcomings that cause frustration for the user and the animal, but the mangers, when used alone, pose similar issues as the hay bag. Some of those issues include a leaf of hay, or other types of feed, easily falling out of the manger and onto the floor of the trailer, where a horse may defecate and urinate on the spilled feed. Furthermore, it becomes difficult to measure the amount of food the horse eats when much of the hay is on the floor of the trailer.

Accordingly, there is a need for a cover that maintains feed in the manger, allows the use of the entire manger, and is inexpensive for a user. The present invention seeks to solve these and other problems.

SUMMARY OF EXAMPLE EMBODIMENTS

In one embodiment, a removably attachable cover system comprises a cover, first trailer fasteners, and second trailer fasteners. The cover may comprise a border. The border may comprise a first side member with a first outer edge and a first inner edge, a second side member with a second outer edge and a second inner edge, a third side member with a third outer edge and a third inner edge, and a fourth side member with a fourth outer edge and a fourth inner edge. The first, second, third, and fourth side members may be fastened together. The first, second, third, and fourth outer edges define and circumscribe the outside edge of the border, while the first, second, third, and fourth inner edges define and circumscribe a first aperture.

The cover may comprise a first strap, a second strap, a third strap, and a fourth strap. The first strap and second strap may be interposed between the second side member and fourth side member, being perpendicular thereto. The third strap and fourth strap may be interposed between the first side member and the third side member. With the first, second, third, and fourth straps attached to the border, a generally grid shaped cover may be produced and second apertures may be found therethrough. That is, with the first, second, third, and fourth straps being parallel and perpendicular to each other. Due to the grid-like structure of the cover, the cover may comprise three columns and three rows. A bottom row may comprise a screen that is the length of the bottom row and that covers each of the second apertures in that row. The screen may be manufactured from an abrasion resistant fabric.

To fasten the cover to the trailer, the cover may comprise a first attachment strap, a second attachment strap, and a third attachment strap on the second side member. The first attachment strap, the second attachment strap, and the third attachment strap may fasten to the second outside edge of the second side member. The first attachment strap may comprise a first fastener, the second attachment strap may comprise a second fastener, and the third attachment strap may comprise a third fastener. Further, the cover may also comprise a fourth attachment strap, a fifth attachment strap, and a sixth attachment strap on the fourth side member. The fourth attachment strap, the fifth attachment strap, and the sixth attachment strap may fasten to the fourth side member. The fourth attachment strap may comprise a fourth fastener, the fifth attachment strap may comprise a fifth fastener, and the sixth attachment strap may comprise a sixth fastener.

In one embodiment, a method of using the system comprises fastening first trailer fasteners to an inner surface of the horse trailer above a manger; fastening a first attachment strap with a first fastener to a first trailer fastener, a second attachment strap with a second fastener to the first trailer fastener, and a third attachment strap with a third fastener to the first trailer fastener; fastening a first manger strap, a second manger strap, and a third manger strap to a side of the manger via the second trailer fasteners; positioning the cover over the manger and the feed; fastening a fourth fastener on a fourth attachment strap to a first manger fastener on a first manger strap, a fifth fastener on a fifth attachment strap to a second manger fastener on a second manger strap, and a sixth fastener on a sixth attachment strap to a third manger fastener on third manger strap; adjusting the first, second, and third attachment straps and the first, second, and third manger straps so as to place the cover over the feed in the manger and the screen over an edge of the manger.

DETAILED DESCRIPTION OF EXAMPLE EMBODIMENTS

Figure 1:
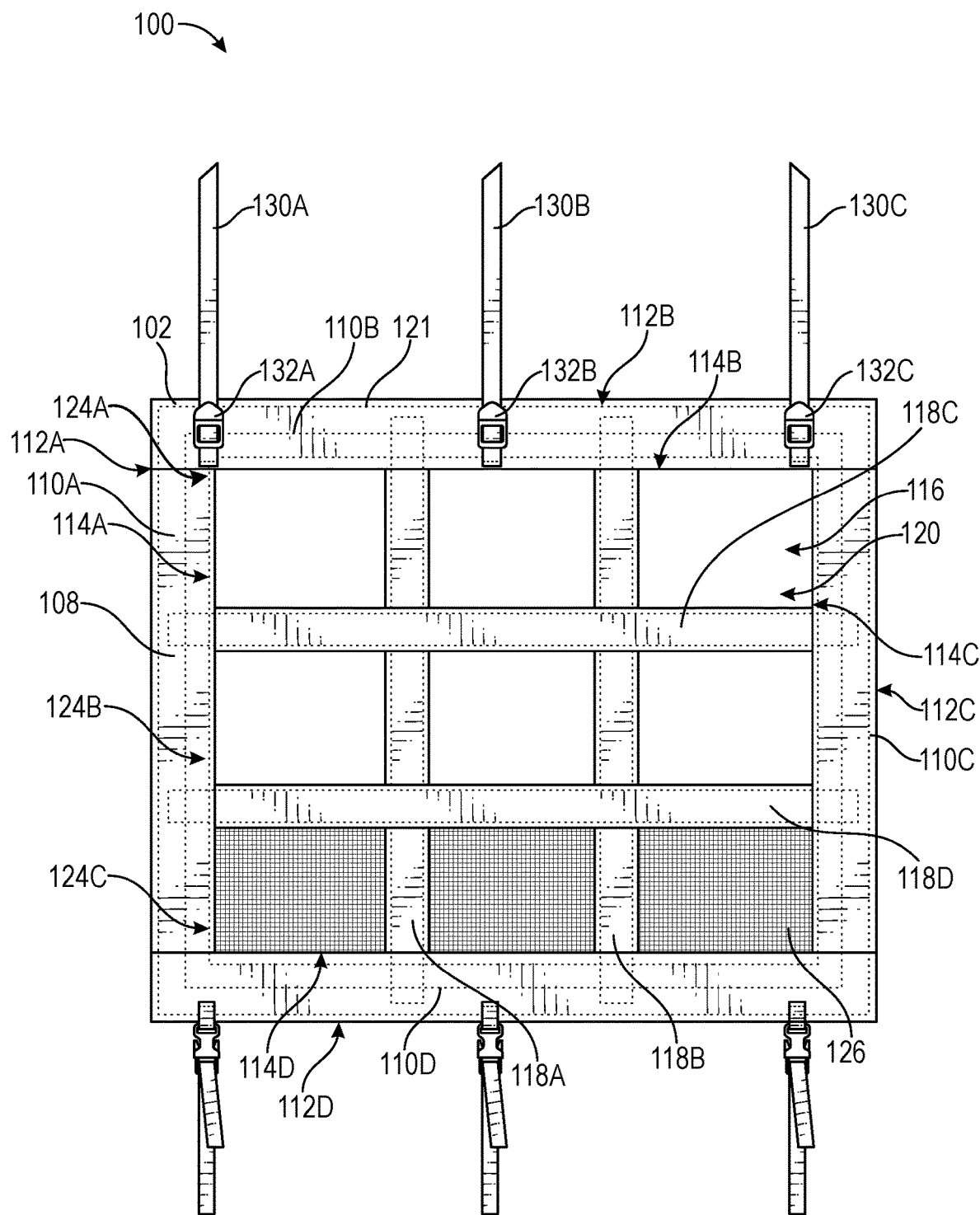
FIG. 1 illustrates a top plan view of a removably attachable cover and system.
Figure 2:
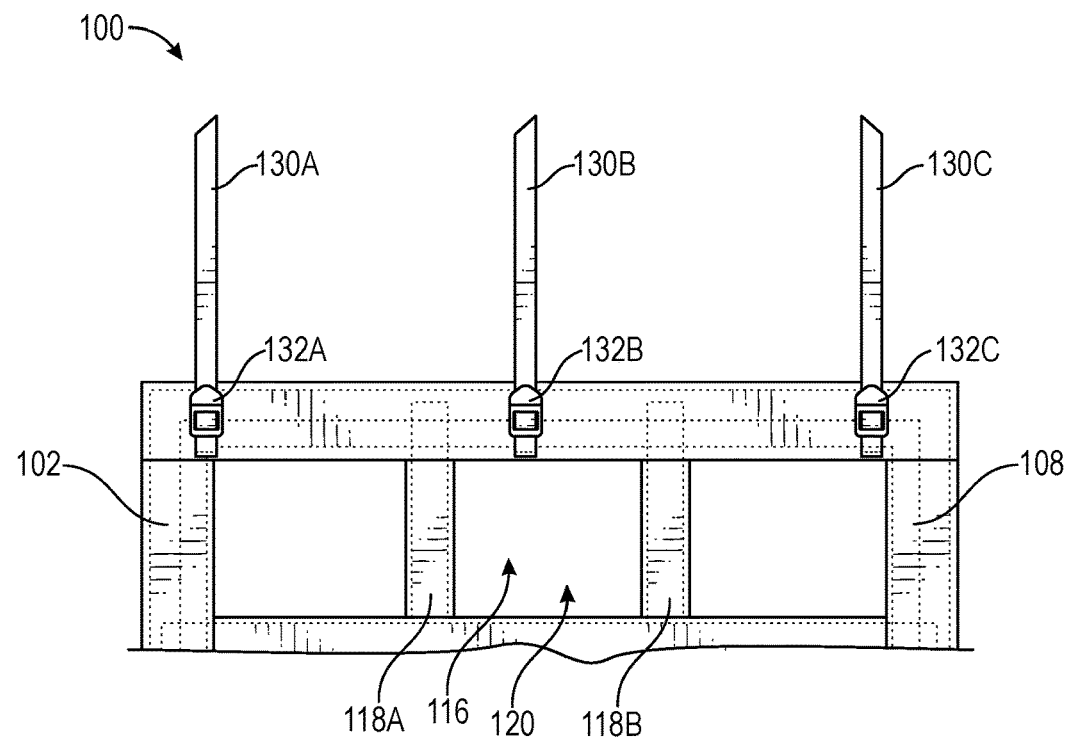
FIG. 2 illustrates a top plan view of a first attachment strap, a second attachment strap, and a third attachment strap of a removably attachable cover and system.
Figure 3:
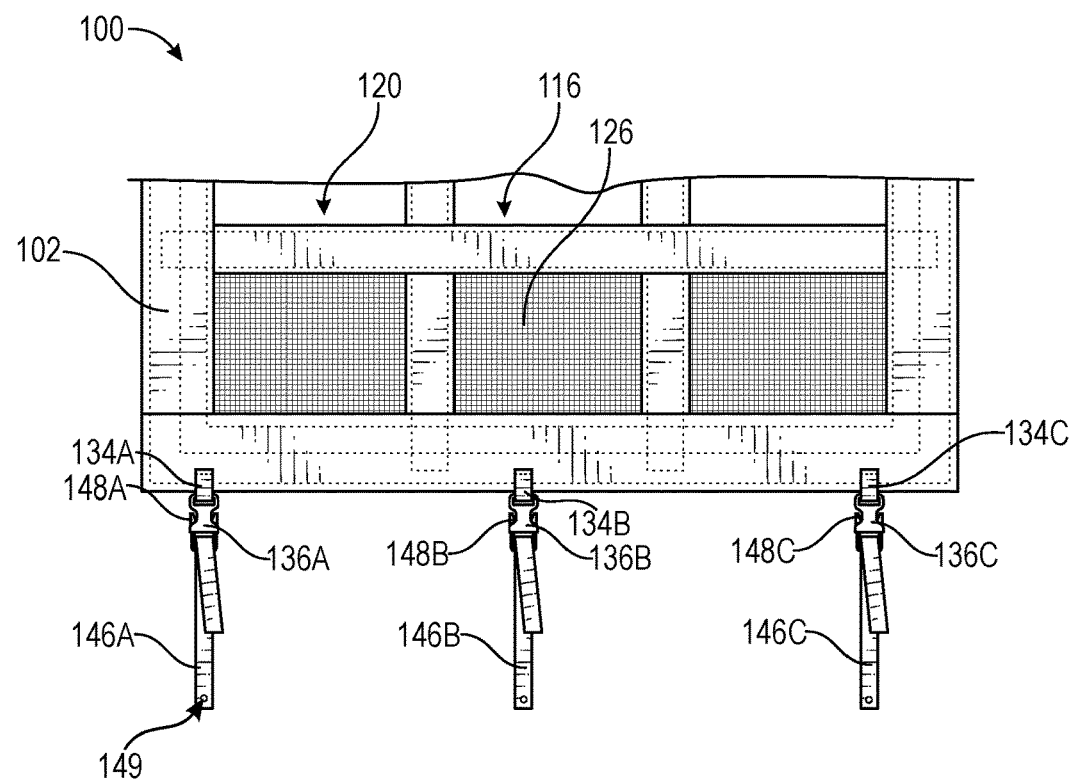
FIG. 3 illustrates a bottom plan view a screen and a first manger strap, a second manger strap, and a third manger strap of a removably attachable cover and system.
Figure 4:
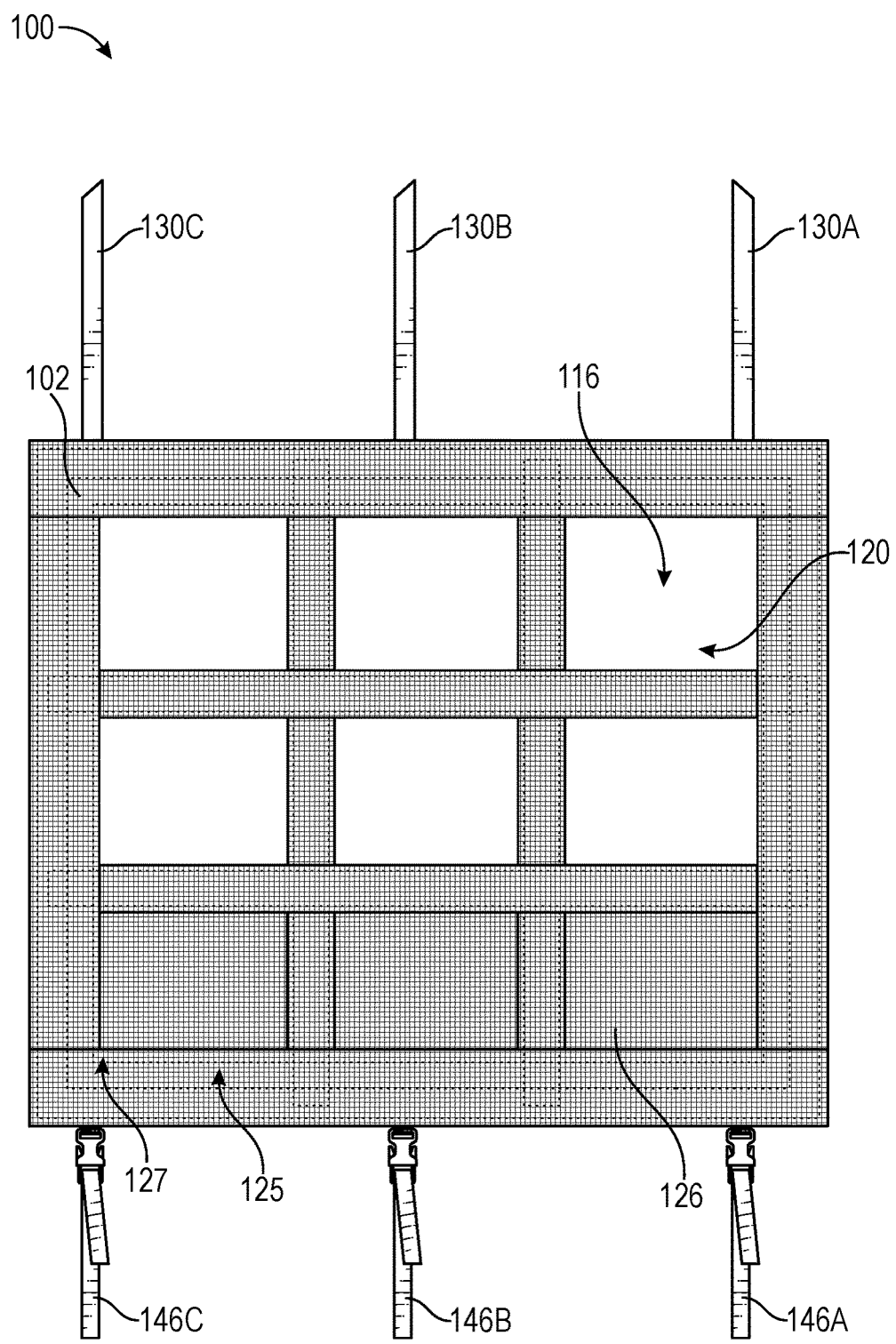
FIG. 4 illustrates a bottom plan view of a removably attachable cover and system.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

As previously described, there is a need for a cover that maintains feed in the manger, allows the use of the entire manger, and is inexpensive for a user. The present invention seeks to solve these and other problems.

Living quarters horse trailers often include mangers where horses, for example, will feed during a journey. In horse trailers, with and without mangers, many rely on hay bags that can hang from hooks within the trailer or may be placed loosely in other parts of the trailer. With this approach, many of these bags are pulled off the hooks, where horses have a hard time obtaining feed and will often destroy the bags by pawing at them. Even if the traditional hay bag is secured in the trailer, they are often cumbersome and not easily placed in a natural position for a horse to feed, which may lead to the horse becoming overstressed and cause health problems. There are other apparatuses on the market that can hold hay in stretchable bags or in pouches on the wall of a horse trailer. However, many of these apparatuses fail to address mangers within a horse trailer, leaving many users to place hay or other feed within the manger unsecured, which may lead to the hay or other feed being spilled onto the unclean floor of the horse trailer. Once the feed has left the manger and fallen on the floor of the trailer, it becomes difficult to measure how much feed has been consumed and to manage the horse's diet. Furthermore, it then becomes necessary for a user to clean the trailer, where the feed has been spilled, so that the horse will not attempt to sift through the bedding (wood chips) and sewage to obtain the feed.

The removably attachable cover system described herein is capable of and configured to maintain feed within a manger, thereby allowing the horse to be properly fed, a user to measure the amount of feed consumed, with less feed on the floor of the trailer, less stress and frustrations placed on the horse, and is easily adjusted to fit any manger in any horse trailer. The removably attachable cover system may include a cover, first trailer fasteners, and second trailer fasteners. The cover may be configured to cover all or a portion of a manger in a horse trailer. The cover may be capable of adjusting to numerous types of mangers. That is, mangers of different sizes, shapes, and depths. The cover many be coupled to the first trailer fasteners and the second trailer fasteners once the feed is positioned thereunder. It will be appreciated that the removably attachable cover is simple to use, protects the horse, and prevents large portions of food from falling to the floor of the trailer.

Figure 6:
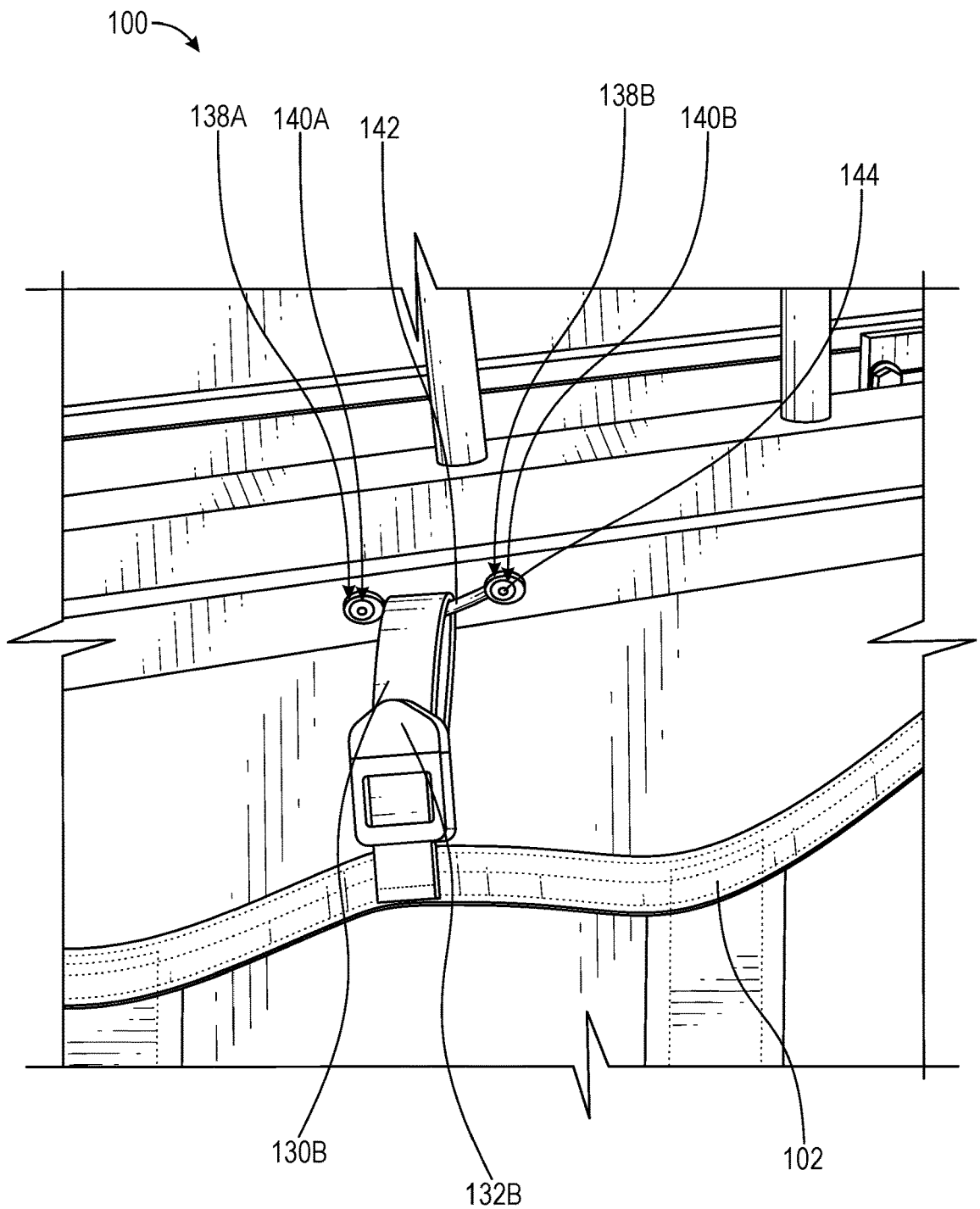
FIG. 6 illustrates a front perspective view of first trailer fasteners of a removably attachable cover and system.
Figure 7:
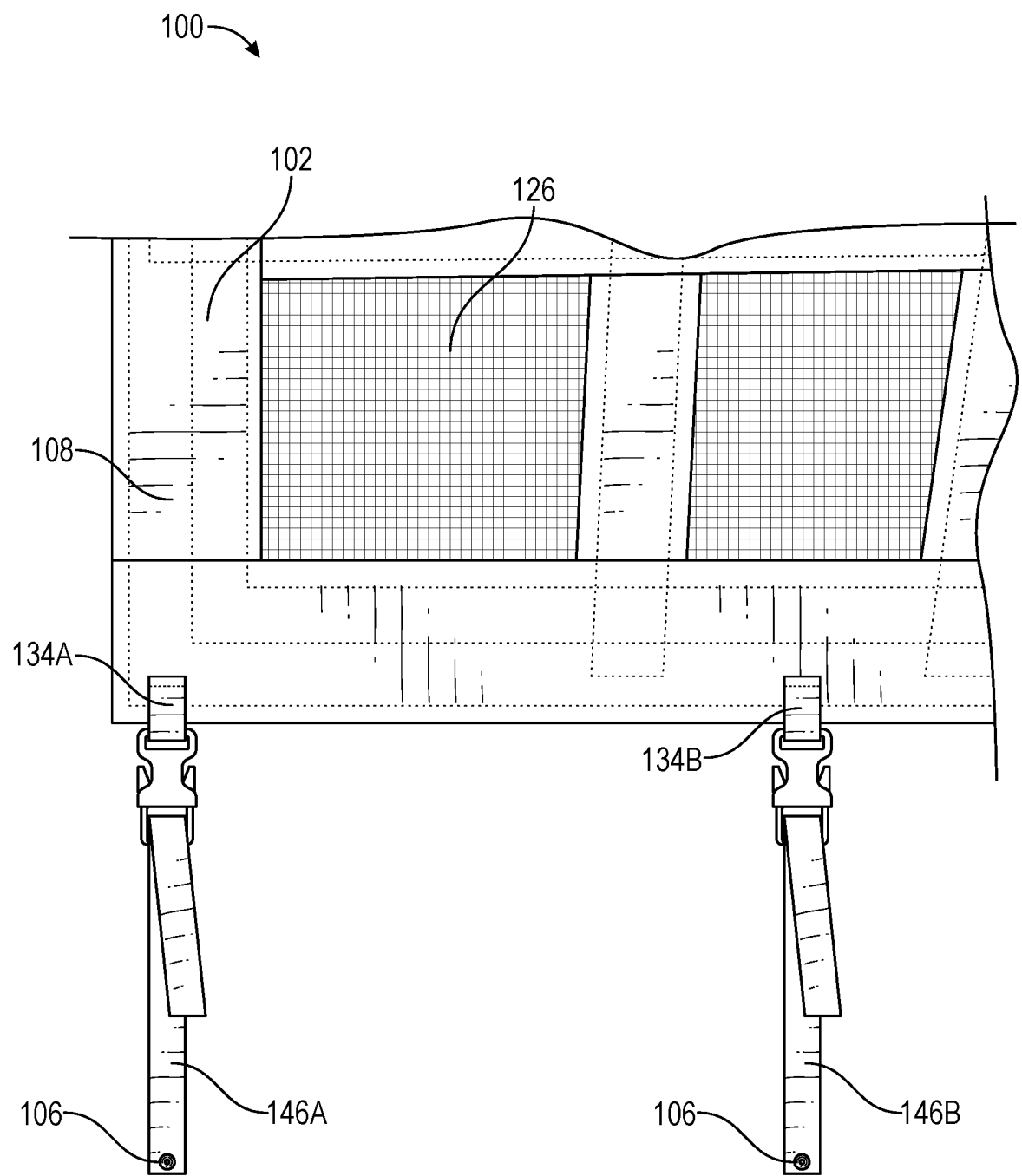
FIG. 7 illustrates a front perspective view of second trailer fasteners of a removably attachable cover and system.
Figure 8:
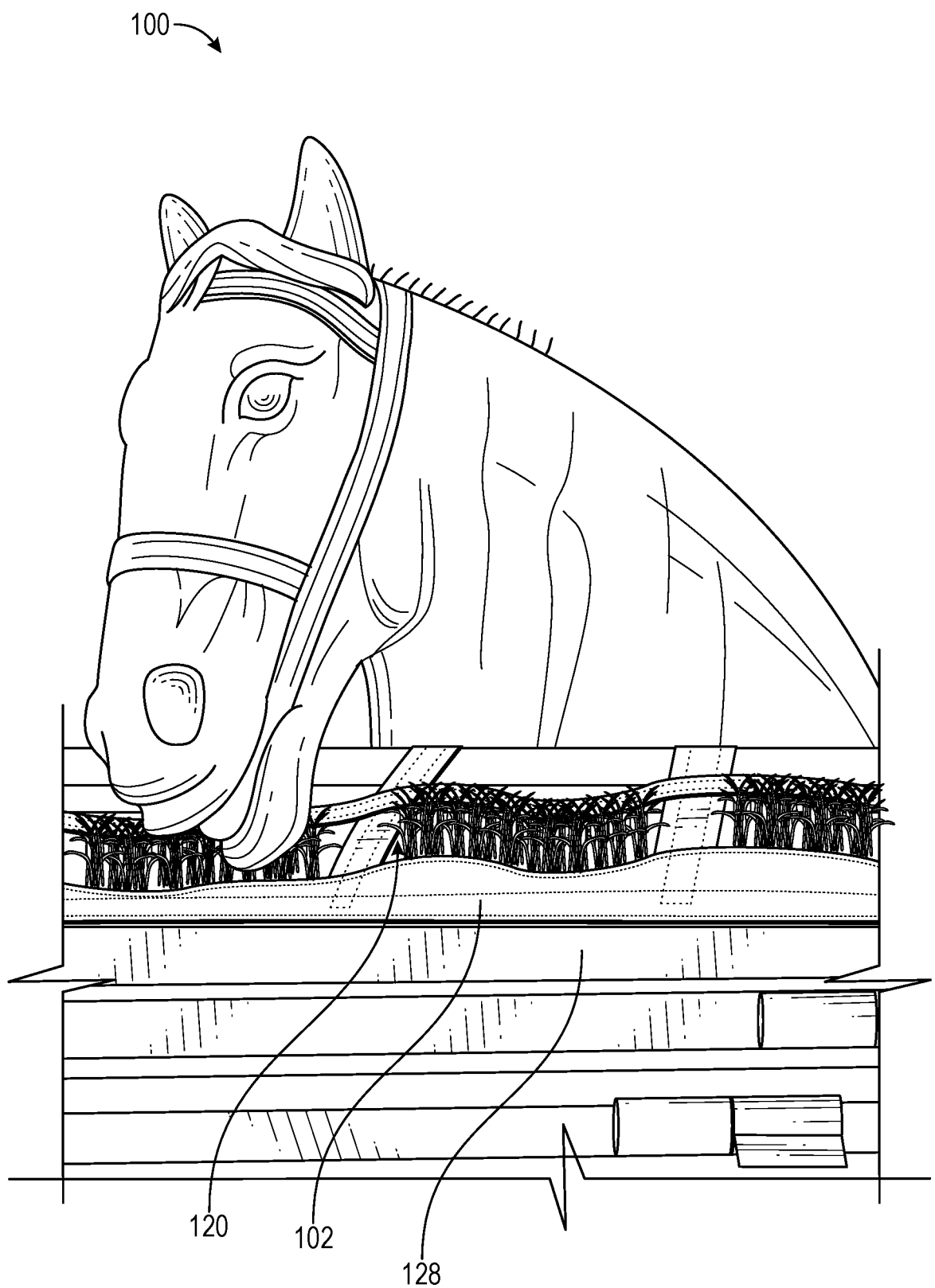
FIG. 8 illustrates a rear, top perspective view of a removably attachable cover and system coupled to a trailer.

As shown in FIGS. 1-4, in one embodiment, a removably attachable cover system 100 (hereinafter referred to as the "system") comprises a cover 102, first trailer fasteners 104A, 104B, 104C (FIGS. 5-6), and second trailer fasteners 106A, 106B, 106C (FIG. 7). The cover 102 may comprise a border 108 that may be of any length and width so as to fit numerous sizes of mangers. The border 108 may comprise a first side member 110A with a first outer edge 112A and a first inner edge 114A, a second side member 110B with a second outer edge 112B and a second inner edge 114B, a third side member 110C with a third outer edge 112C and a third inner edge 114C, and a fourth side member 110D with a fourth outer edge 112D and a fourth inner edge 114D. The first, second, third, and fourth side members 110A-110D may be generally flat, rectangular-shaped members. The first, second, third, and fourth side members 110A-110D may be fastened together via sewing. Other fastening mechanisms to couple the side members 110A-110D together may include, but are not limited to, fabric welding, snaps, hook and loop, or a combination thereof. In particular, the first side member 110A may couple to the second side member 110B, the second side member 110B may couple to the third side member 110C, the third side member 110C may couple to the fourth side member 110D, and the fourth side member may be coupled to the first side member 110A, thereby forming the border 108. In some embodiments, the second side member 110B may receive a fastener, such as sewing, to the second outer edge 112B so as to prevent separation from a screen discussed herein. Other side members may also be sewn to the inner and outer edge preventing separation.

The first, second, third, and fourth outer edges 112A-112D define and circumscribe the outside edge of the border 108, while the first, second, third, and fourth inner edges 114A-114D define and circumscribe a first aperture 116. The cover may comprise a first strap 118A, a second strap 118B, a third strap 118C, and a fourth strap 118D. The first strap 118A and second strap 118B (together a plurality of first straps) may be interposed between the second side member 110B and fourth side member 110D, being perpendicular thereto. The third strap 118C and fourth strap 118D (together a plurality of second straps) may be interposed between the first side member 110A and the third side member 110C, being perpendicular thereto. The first strap 118A may be coupled to the third and fourth straps 118C-118D. The second strap 118B may be coupled to the third and fourth straps 118C-118D. The first, second, third, and fourth straps 118A-118D may be placed apart a first distance, such as 2 inches, 3 inches, or 4 inches. The first, second, third, and fourth straps 118A-118D may be coupled to the border 108 via sewing, fabric welding, or other permanent fastening mechanism. The first, second, third, and fourth straps 118A-118D may also be coupled to the border 108 via hook and loop, snaps, zippers, or other non-permanent, removably attachable fastening mechanisms. With the first, second, third, and fourth straps 118A-118D attached to the border 108, a generally grid-shaped cover 102 may be produced and second apertures 120 may be found therethrough. That is, with the first, second, third, and fourth straps 118A-118D being parallel and perpendicular to each other, the grid shape is produced with second apertures 120. It will be understood that while there are four straps 118A-118D illustrated, any number of straps may be used at numerous distances, which can change the size and number of second apertures 120. Furthermore, the first, second, third, and fourth straps 118A-118D may vary in width and length. The border 108 and the straps 118A-118D may create a first layer 121.

The second apertures 120 may vary in shape and size due to the placement of the first, second, third, and fourth straps 118A-118D and/or width of the first, second, third, and fourth straps 118A-118D. The first, second, third, and fourth straps 118A-118D may be generally flat, rectangular-shaped. Any other shape for the first, second, third, and fourth straps 118A-118D may be envisioned without departing from the present invention. In some embodiments, the first, second, third, and fourth side members 110A-110D may be cylindrical shaped as well as the first, second, third, and fourth straps 118A-118D. As shown, the second apertures 120 may be quadrangle. However, it will be understood that other shapes of the second apertures 120 may be used without departing from the present invention, such as circular, rectangular, or some combination thereof. The first, second, third, and fourth side members 110A-110D and the first, second, third, and fourth straps 118A-118D may be nylon. Other materials for the first, second, third, and fourth side members 110A-110D and first, second, third, and fourth straps 118A-118D may include, but are not limited to, cordura, neoprene, Kevlar, polyester, polypropylene, some combination thereof, or other non-stretchable or stretchable material.

Due to the grid-like structure of the cover 102, the cover 102 may comprise three columns 122A-122C and three rows 124A-124C. While the drawings illustrate three columns 122A-122C and three rows 124A-124C (found between the border 108 and the straps 118A-118D), in some embodiments, the cover 102 may comprise two or more columns and two or more rows or one column and one row. A bottom row 124C may comprise a screen 126 that is the length of the bottom row 124C and that covers each of the second apertures 120 in that row 124C. As illustrated, the screen 126 may overlay the entirety and outline a lower surface 125 of the cover 102, acting as a second layer 127 while the border 108 and straps 118A-118D act as the first layer 121. The straps 118A-118D may be interposed between the border 108 and screen 126. The screen 126 may act as a protective layer for the cover 102. In some embodiments, the screen may comprise multiple, separate components so as to cover each second aperture 120 on the bottom row 124C separately. The screen 126 may be manufactured from the same material as the first, second, third, and fourth straps 118A-118D or may be manufactured from a different material. The screen 126 may be manufactured from an abrasion resistant fabric, such as Kevlar. The screen 126, once the cover 102 is placed over a manger 128 in a trailer, helps protect the first, second, and fourth straps 118A, 118B, 118D from wear as it may rest on the edge of the manger 128 and be rubbed thereon as a horse feeds. The screen 126 may be coupled to the bottom row 124C via sewing. Other fastening mechanisms may include fabric welding or any other permanent fastening mechanism. In some embodiments, the screen 126 may be removably attachable to the bottom row 124C via hook and loop, snaps, or any other non-permanent fastening mechanism.

To fasten the cover 102 to the trailer, the cover 102 may comprise a first attachment strap 130A, a second attachment strap 130B, and a third attachment strap 130C on the second side member 110B. The first attachment strap 130A, the second attachment strap 130B, and the third attachment strap 130C may, in some embodiments, fasten to the second outside edge 112B of the second side member 110B. It will be understood that more or less than three attachment straps may be used. That is, in some embodiments, the second side member 110B may comprise two attachment straps. It will further be understood that the first attachment strap 130A, the second attachment strap 130B, and the third attachment strap 130C may be coupled to any other of the side members, such as the first, third, or fourth 110A, 110C, 110D. The first, second, and third attachment straps 130A, 130B, 130C may be fastened to the cover 102 via sewing, fabric welding, hook and loop, snaps, or any other permanent and/or non-permanent fastening mechanisms.

The first attachment strap 130A may comprise a first fastener 132A, the second attachment strap 130B may comprise a second fastener 132B, and the third attachment strap 130C may comprise a third fastener 132C. As an example, the first fastener 132A, the second fastener 132B, and the third fastener 132C may be slider buckles. Other fastening mechanisms for the first, second, and third fasteners 132A-132C may comprise side release buckles, hook and loop, etc.

Further, the cover 102 may also comprise a fourth attachment strap 134A, a fifth attachment strap 134B, and a sixth attachment strap 134C on the fourth side member 110D. The fourth attachment strap 134A, the fifth attachment strap 134B, and the sixth attachment 134C may fasten, in some embodiments, to the fourth outside edge 112D of the fourth side member 110D. It will be understood that more or less than three attachment straps may be used. That is, in some embodiments, the fourth side member 110D may comprise two attachment straps. It will further be understood that the fourth attachment strap 134A, the fifth attachment strap 134B, and the sixth attachment strap 134C may be coupled to any other of the side members, such as the first or third 110A, 110C. The fourth, fifth, and sixth attachment straps 134A, 134B, 134C may be fastened to the cover 102 via sewing, fabric welding, hook and loop, snaps, or any other permanent and/or non-permanent fastening mechanisms.

The fourth attachment strap 134A may comprise a fourth fastener 136A, the fifth attachment strap 134B may comprise a fifth fastener 136B, and the sixth attachment strap 134C may comprise a sixth fastener 136C. As an example, the fourth fastener 136A, the fifth fastener 136B, and the sixth fastener 136C may be side release buckles. Other fastening mechanisms for the first and second fasteners 136A-136C may comprise lock slider buckles, hook and loop, etc.

In some embodiments, snaps, hook and loop, or other fastening mechanisms may be positioned on the border 108 instead of the first, second, and third attachment straps 130A-130C and the fourth, fifth, and sixth attachment straps 134A-134C. In other embodiments, the first, second, and third attachment straps 130A-130C and the fourth, fifth, and sixth attachment straps 134A-134C may all comprise webbing strap sliders to secure the cover 102 to the trailer. In addition, the first, second, and third attachment straps 130A-130C and the fourth, fifth, and sixth attachment straps 134A-134C may be nylon, or other material whether stretchable or non-stretchable material.

Figure 5:
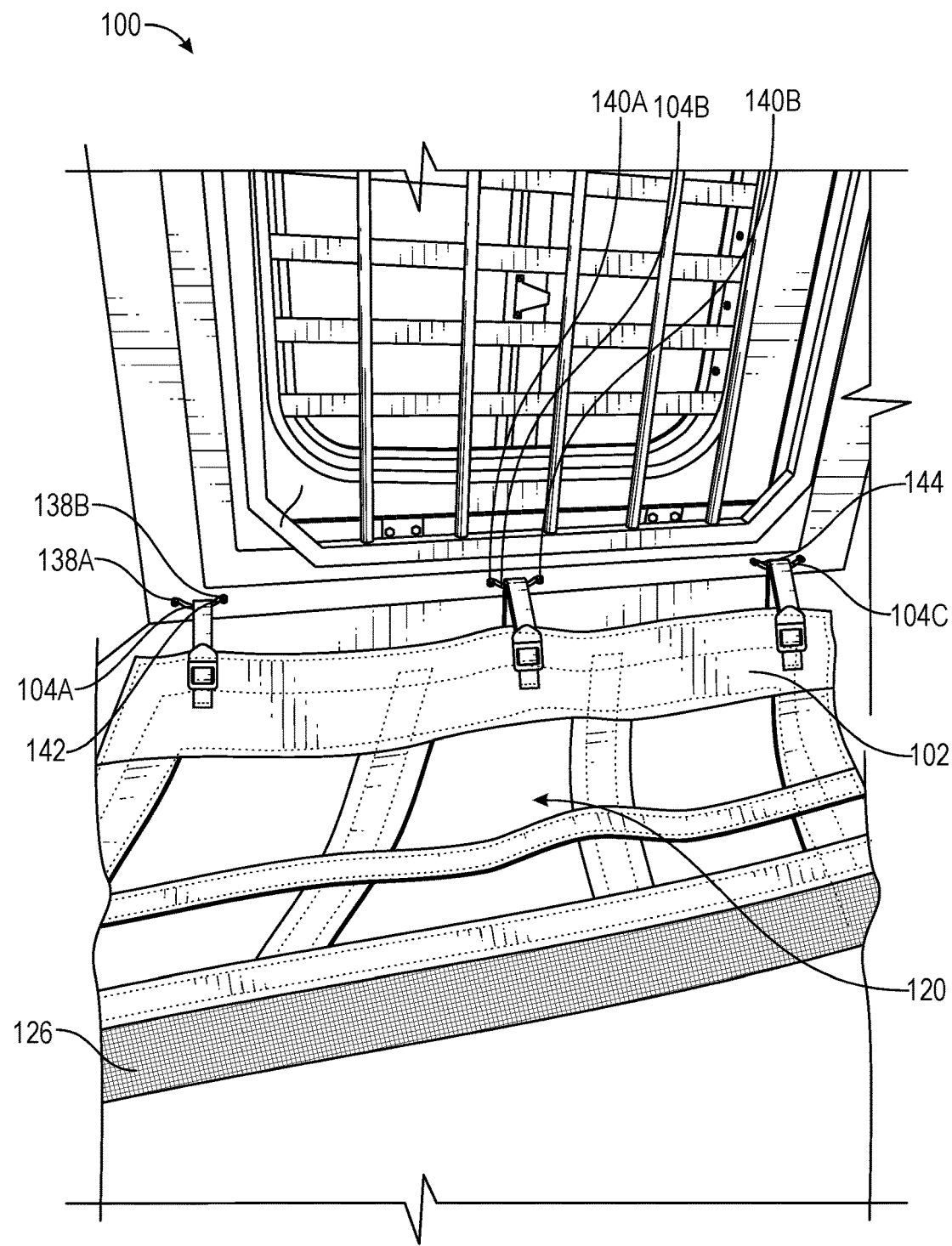
FIG. 5 illustrates a front, top perspective view of a removably attachable cover and system coupled to a trailer.

As shown in FIGS. 5-6, the system may also comprise the first trailer fasteners 104A-104C, and the second trailer fasteners 106A, 106B. The first trailer fasteners 104A-104C may be footman loops or other types of fasteners, such as snaps. The first trailer fasteners 104A-104C may comprise a first end 138A with a first opening 140A and a second end 138B with a second opening 140B. Interposed between the first end 138A and the second end 138B is a raised portion 142. The first trailer fasteners 104A, 104B may be coupled to the inner wall via couplers 144, such as screws, bolts and nuts, or rivets. The first, second, and third attachment straps 130A-130C may couple to the first trailer fasteners 104A-104C and be adjusted via the first, second, and third fasteners 132A-132C.

In an alternate embodiment, the system 100 may comprise a first trailer strap comprising a first trailer strap fastener, such as a side release buckle, so as to be coupleable to the first fastener 132A on the first attachment strap 130A, and a second trailer strap comprising a second trailer strap fastener, such as a side release buckle, so as to be coupleable to the second fastener 132B on the second attachment strap 130B.

The second trailer fasteners 106 (Shown in FIG. 7) may be coupled to a side, either a first, second, or third side, of the manger. The second trailer fasteners 106 may be rivets. Other second trailers fasteners 106 may include, but are not limited to, footman loops, snaps, screws, bolts and nuts, or any other fastening mechanism. Returning to FIGS. 3-4, to use the second trailer fasteners 106, the second trailer fasteners 106 may fasten to the side of the manger and more particularly, fasten a first manger strap 146A, a second manger strap 146B, and a third manger strap 146C to the side of the manger. The first manger strap 146A may comprise a first manger fastener 148A, such as a side release buckle, so as to be coupleable to the fourth fastener 136A. The second manger strap 146B may comprise a second manger fastener 148B, such as a side release buckle, so as to be coupleable to the fifth fastener 136B. The third manger strap 146C may comprise a third manger fastener 148C, such as a side release buckle, so as to be coupleable to the sixth fastener 136C. The second trailer fasteners 106 may be positioned through openings 149 on the first, second, and third manger straps 146A-146C so as to be coupled to the wall of the manger. While numerous straps are shown to attach the cover 102 to the trailer, it will be understood that one or more straps may be used to couple the cover 102 to the trailer. For example, two straps may be used to couple the second side member 110B to the trailer while four straps may be used to couple the fourth side member 110D to the trailer.

Furthermore, in some embodiments, instead of the first, second, and third manger straps 146A-146C, as shown, cords, chains or other adjustable tethering mechanisms may be used. Once the first, second, and third manger straps 146A-146C and the first, second, and third attachment straps 130A-130C, with their respective fasteners, are coupled to the cover 102, the cover may be adjusted to fit over the manger and may be quickly adjusted so as to accommodate any amount of feed. Furthermore, the cover 102 may be adjusted so that the screen 126 may rest over the edge of the manger.

Figure 9:
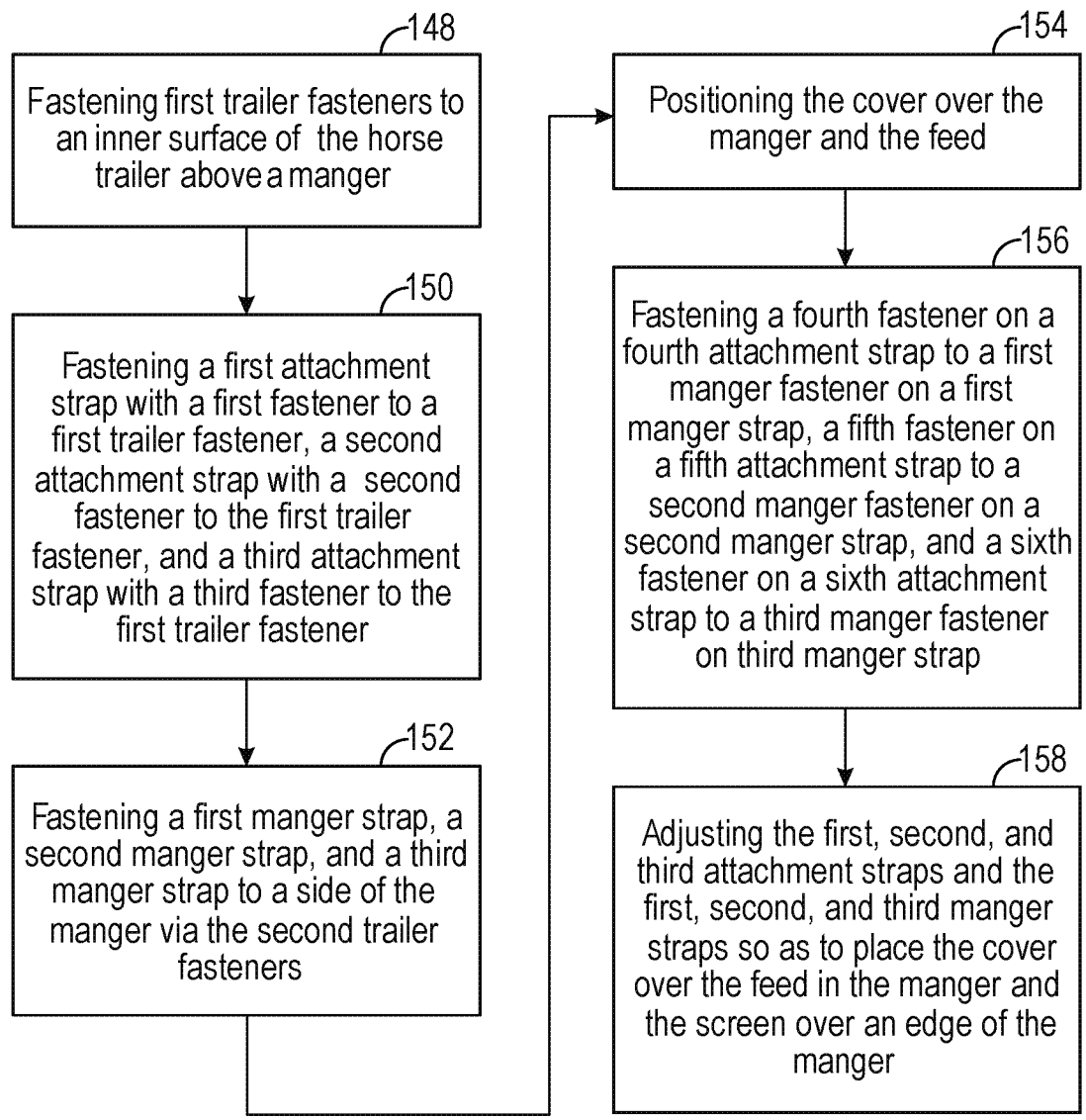
FIG. 9 illustrates a diagram of a method of using a removably attachable cover and system.

In one embodiment, as shown in FIG. 9, a method of using the system 100 comprises fastening first trailer fasteners 104A-104C to an inner surface of the horse trailer above a manger at step 148; fastening a first attachment strap 130A with a first fastener 132A to a first trailer fastener 104A, a second attachment strap 130B with a second fastener 132B to the first trailer fastener 104B, and a third attachment strap 130C with a third fastener 132C to the first trailer fastener 104C at step 150; fastening a first manger strap 146A, a second manger strap 146B, and a third manger strap 146C to a side of the manger via the second trailer fasteners 106 at step 152; positioning the cover 102 over the manger and the feed at step 154; fastening a fourth fastener 136A on a fourth attachment strap 134A to a first manger fastener 148A on a first manger strap 146A, a fifth fastener 136B on a fifth attachment strap 134B to a second manger fastener 148B on a second manger strap 146B, and a sixth fastener 136C on a sixth attachment strap 134C to a third manger fastener 148C on third manger strap 146C at step 156; adjusting the first, second, and third attachment straps 130A-130C and the first, second, and third manger straps 146A-146C so as to place the cover 102 over the feed in the manger and the screen 126 over an edge of the manger at step 158.

Figure 10:
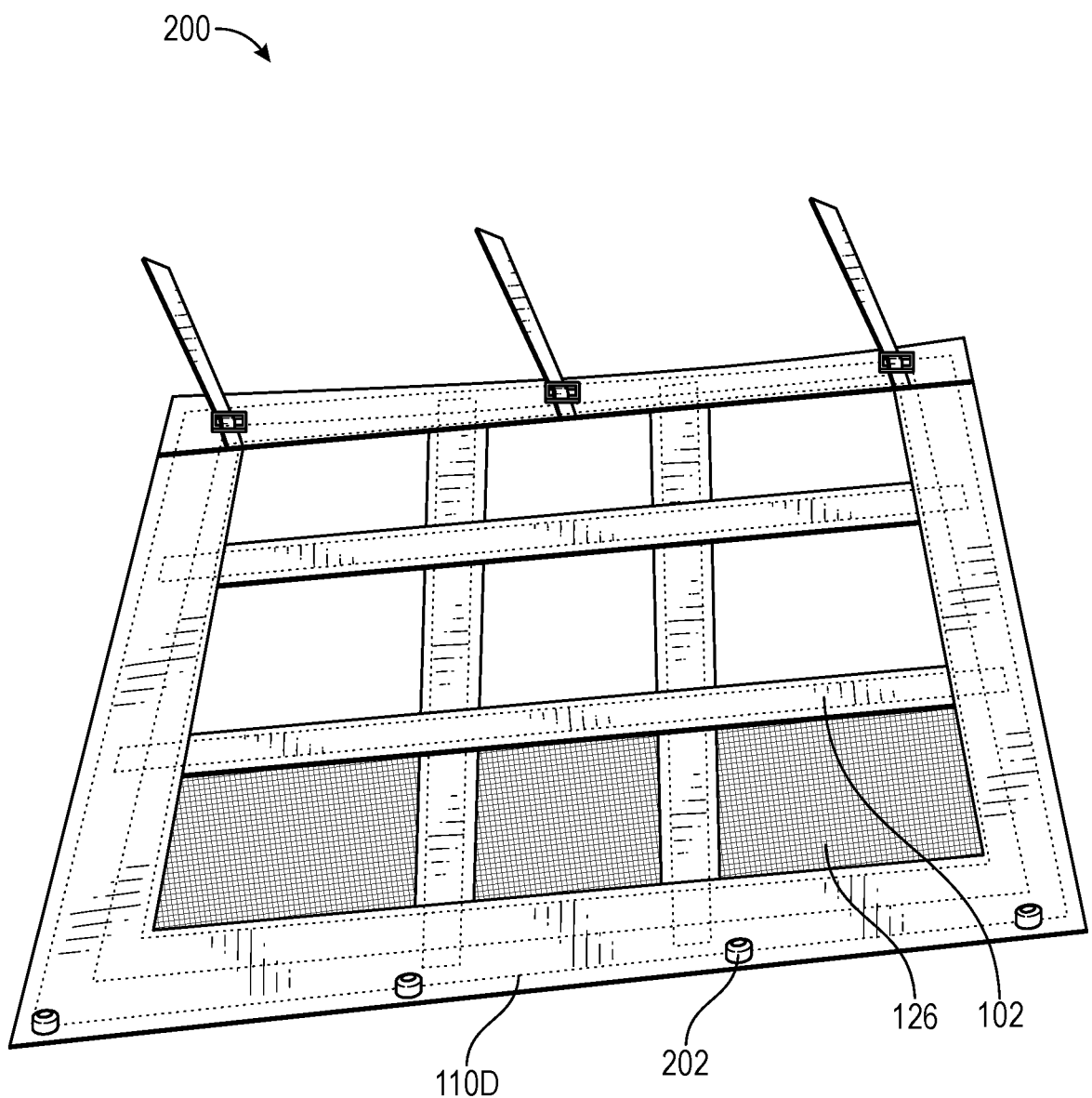
FIG. 10 illustrates a front, top perspective view of a removably attachable cover and system.

In one embodiment, as shown in FIG. 10, a system 200 may comprise snap fasteners 202 on the fourth side member 110D so as to be removably attachable to a side of the manger. It will be appreciated that the components in system 100 may be used in system 200 and vice versa.

It will be appreciated that the system 100, 200 acts as a regulated feeding device for an animal. That is, a horse, for example, is forced to eat slowly due to only small amounts of feed being removed through the second apertures at a time. It will further be appreciated that when using the system 100, 200, feed will stay in the manger and thus, will not fall to the trailer floor, thereby allowing bedding on the floor to last longer. Further, the system 100, 200 allows the user to monitor the amount of feed an animal consumes and the horse is not stressed, leading to overall better health.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. A system for mangers of horse trailers, the system comprising:
    a cover comprising:
        a border, the border comprising:
            a first side member having a first outer edge and a first inner edge,
            a second side member having a second outer edge and a second inner edge,
            a third side member having a third outer edge and a third inner edge,
            a fourth side member having a fourth outer edge and a fourth inner edge,
            wherein the first side member couples to the second side member,
            the second side member couples to the third side member, the third side member couples to the fourth side member, and the fourth side member couples to the first side member to form the border of the cover;
            the first inner edge, second inner edge, third inner edge, and fourth inner edge define a first aperture;
    a first strap and a second strap coupled to and interposed between the second side member and the fourth side member;
    a third strap and fourth strap coupled to and interposed between the first side member and the third side member;
    second apertures interposed between the border, the first strap, the second strap, the third strap, and the fourth strap where an animal may access feed;
        a bottom row comprising a cover that passes over the second apertures on the bottom row and rests on an edge of a manger, the cover comprising an abrasion resistant material;
        a first attachment strap, a second attachment strap, a third attachment strap coupled to the second side member;
        a fourth attachment strap, a fifth attachment strap, and a sixth attachment strap coupled to the fourth side member;
    first trailer fasteners;
    second trailer fasteners; and
    a first manger strap, a second manger strap, and a third manger strap that couple to the manger via the second trailer fasteners.

* * * * *